US012532267B2

(12) United States Patent
Ou et al.

(10) Patent No.: US 12,532,267 B2
(45) Date of Patent: Jan. 20, 2026

(54) ADAPTIVE RADIO DOWNLINK OUTPUT POWER COMPENSATION BASED ON TEMPERATURE AND TRAFFIC LOAD

(71) Applicant: Dell Products L.P., Round Rock, TX (US)

(72) Inventors: Steven Ou, Kanata (CA); Ahmad Farhoodi, Kanata (CA); Tommy Ivarsson, Nepean (CA)

(73) Assignee: Dell Products L.P., Round Rock, TX (US)

( * ) Notice: Subject to any disclaimer, the term of this patent is extended or adjusted under 35 U.S.C. 154(b) by 357 days.

(21) Appl. No.: 18/363,078

(22) Filed: Aug. 1, 2023

(65) Prior Publication Data

US 2025/0048275 A1  Feb. 6, 2025

(51) Int. Cl.
*H04W 52/26* (2009.01)
*H04W 52/14* (2009.01)

(52) U.S. Cl.
CPC ......... *H04W 52/26* (2013.01); *H04W 52/143* (2013.01)

(58) Field of Classification Search
CPC ... H04W 52/26; H04W 52/14; H04W 52/143; H04L 1/0026; H04L 1/0029
See application file for complete search history.

(56) References Cited

U.S. PATENT DOCUMENTS

| | | | | |
|---|---|---|---|---|
| 8,204,454 | B2 * | 6/2012 | Yamaoka | H03F 1/3288 455/114.2 |
| 8,229,376 | B2 * | 7/2012 | Li | H03F 1/32 455/67.11 |
| 8,422,959 | B2 * | 4/2013 | Li | H04W 52/52 455/67.11 |
| 2009/0072900 | A1 * | 3/2009 | Park | H03F 1/3282 370/294 |
| 2009/0195309 | A1 * | 8/2009 | Yamaoka | H03F 1/3288 330/149 |

(Continued)

FOREIGN PATENT DOCUMENTS

| | | | | |
|---|---|---|---|---|
| WO | WO-2022229046 A1 * | 11/2022 | | H03F 3/24 |
| WO | WO-2023121138 A1 * | 6/2023 | | H04B 1/0475 |

*Primary Examiner* — Hai V Nguyen
(74) *Attorney, Agent, or Firm* — Amin, Turocy & Watson, LLP

(57) ABSTRACT

The technology described herein is directed towards determining (e.g., a base station's) radio downlink power output based on traffic load data and temperature data. The downlink power output can be a compensation value that modifies the radio's power output by adapting to dynamic traffic load and temperature changes. Using traffic load and temperature results in more accurate power compensation. In one implementation, the current (most-recent) traffic load data and temperature data are used to obtain bounding values from a table indexed by traffic load data intervals and temperature data intervals. The bounding values are interpolated to find a power compensation value. By considering the downlink traffic, good correlation is maintained between the radio internal temperature reading and the actual radio ambient temperature, resulting in a more accurate power compensation value for any combination of downlink traffic load and internal temperature reading. This results in improved serving cell coverage.

20 Claims, 11 Drawing Sheets

(56) References Cited

U.S. PATENT DOCUMENTS

| | | | |
|---|---|---|---|
| 2010/0210231 A1* | 8/2010 | Li | H03F 3/24 |
| | | | 455/226.2 |
| 2010/0240325 A1* | 9/2010 | Li | H04W 52/52 |
| | | | 455/84 |
| 2015/0010118 A1* | 1/2015 | Beidas | H04L 25/0314 |
| | | | 375/341 |
| 2015/0098521 A1* | 4/2015 | Beidas | H03F 1/3241 |
| | | | 375/296 |
| 2024/0223135 A1* | 7/2024 | Ali | H03F 1/32 |
| 2024/0283472 A1* | 8/2024 | Woo | H03F 1/32 |
| 2025/0088240 A1* | 3/2025 | Marcone | H04B 7/088 |
| 2025/0148376 A1* | 5/2025 | Gao | H03F 1/0261 |

* cited by examiner

217 (Traditional table)

| Radio temperature reading (Degree C) | DL power compensation value (dB) |
|---|---|
| 95 | -0.5 |
| 85 | 1.3 |
| 75 | 0.9 |
| 65 | 0 |
| 55 | -0.8 |
| 45 | -1.5 |
| 25 | -2.1 |
| 15 | -2.8 |
| 0 | -3.6 |

*Re-developed with Traffic Load Consideration*

216 — DL power compensation value (dB)

| Radio temperature reading (Degree C) | Traffic load (%) | | | | | | | | | |
|---|---|---|---|---|---|---|---|---|---|---|
| | 10% | 20% | 30% | 40% | 50% | 60% | 70% | 80% | 90% | 100% |
| 95 | -1.7 | -1.6 | -1.4 | -1.3 | -1.2 | -1.1 | -0.9 | -0.7 | -0.6 | -0.5 |
| 85 | -0.4 | -0.2 | 0 | 0.2 | 0.4 | 0.6 | 0.7 | 0.9 | 1.1 | 1.3 |
| 75 | -0.7 | -0.5 | -0.2 | 0 | 0.2 | 0.4 | 0.3 | 0.5 | 0.7 | 0.9 |
| 65 | -1.4 | -1.1 | -0.9 | -0.8 | -0.7 | -0.6 | -0.5 | -0.3 | -0.2 | 0 |
| 55 | -2.2 | -2 | -1.9 | -1.7 | -1.5 | -1.4 | -1.3 | -1.2 | -1 | -0.8 |
| 45 | -3.4 | -2.9 | -2.7 | -2.5 | -2.5 | -2.4 | -2.2 | -2.1 | -1.7 | -1.5 |
| 25 | -4 | -3.6 | -3.4 | -3.2 | -3 | -2.9 | -2.7 | -2.6 | -2.4 | -2.1 |
| 15 | -4.4 | -4.2 | -4 | -3.8 | -3.6 | -3.5 | -3.3 | -3.1 | -3 | -2.8 |
| 0 | -5.2 | -4.7 | -4.6 | -4.4 | -4.2 | -4 | -3.9 | -3.8 | -3.7 | -3.6 |

FIG. 2 ately be carried out by multiple devices in association. -->

ADAPTIVE RADIO DOWNLINK OUTPUT POWER COMPENSATION BASED ON TEMPERATURE AND TRAFFIC LOAD

BACKGROUND

In developing a radio such as fifth generation (5G) user equipment, as part of the development stage a downlink output power over temperature compensation lookup table is created. This is traditionally done by testing radio units in a temperature-controlled environment. A relationship characterization is determined by recording the designated temperature sensor readings and needed power compensation values at each set temperature over an operating temperature range (e.g., minus degrees 40° C. to plus degrees 55° C. generally in steps of 10 degrees ° C.). Due to self-heating from radio circuitry, readings from radio temperature sensors are higher than the radio ambient temperature. The radio temperature reading range is shifted (e.g., degrees 0° C. to plus degrees 95° C.). The generated lookup table of temperature-to-power values is saved to a radio database for the radio software to access for compensation.

When the radio is in the field, the radio software obtains the designated temperature sensor reading, and retrieves the corresponding saved temperature-to-power compensation value from the lookup table stored in the radio database. The retrieved compensation value is applied to the downlink power/gain actuator to adjust the output power to meet accuracy requirements based on the currently measured temperature. The DL power/gain actuator adjustment is usually done based on the feedback path gain variation through close loop gain control operation. The gain compensation table is used to offset the feedback path gain in order to achieve downlink output power actuation.

BRIEF DESCRIPTION OF THE DRAWINGS

The technology described herein is illustrated by way of example and not limited in the accompanying figures in which like reference numerals indicate similar elements and in which:

FIG. 2 is a representation of an example compensation value data structure in which temperature intervals are first dimension indexes and traffic load intervals are second dimension indexes for compensation value elements, in accordance with various aspects and implementations of the subject disclosure.

DETAILED DESCRIPTION

Various aspects of the technology described herein are generally directed towards determining radio downlink power output based on the current traffic load data (e.g., a percentage value based on most recent traffic) along with current (real time) temperature data. The downlink power output can be a compensation value that modifies (increases or decreases) the radio's downlink power/gain actuator by adapting to traffic load and temperature changes.

Using both traffic load and temperature reduces key performance indicator (KPI) (or other metrics) loss for network operators that are caused by inaccurate downlink power compensation over dynamic traffic loads. Traffic loads over a full dynamic range are included in creation of the power compensation value data structure (e.g., table), which is maintained on the radio and used by power compensation logic (e.g., an application) when the radio is operating in the field.

It should be understood that any of the examples herein are non-limiting. As one example, the technology is described in a new radio environment, however this is only an example and can be implemented in similar environments, including those not yet implemented. It also should be noted that terms used herein, such as "optimization," "optimize" or "optimal" and the like (e.g., "maximize," "minimize" and so on) only represent objectives to move towards a more optimal state, rather than necessarily obtaining ideal results.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
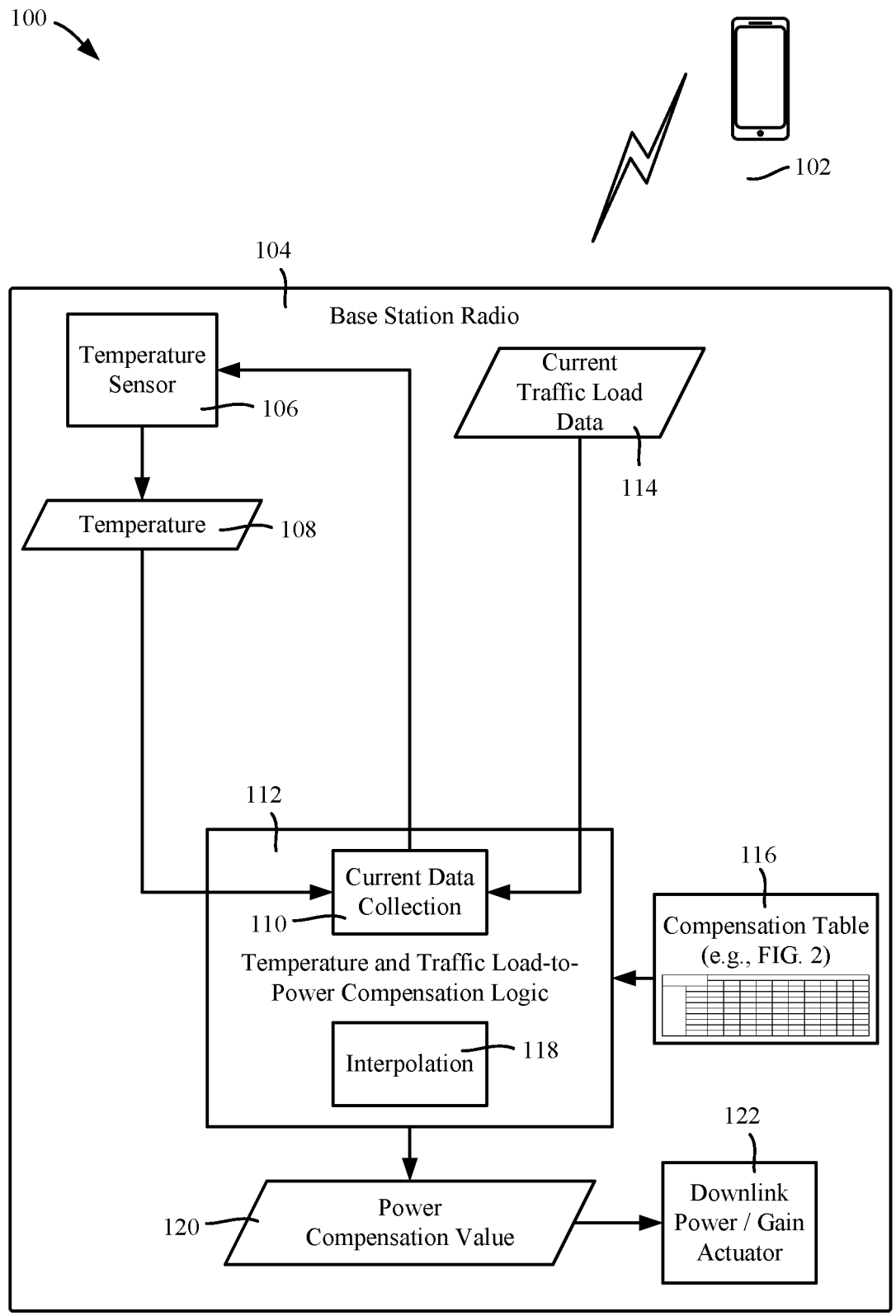
FIG. 1 depicts an example block diagram representation of an example system/architecture including radio equipment configured to determine a power compensation value based on current temperature data and traffic load data, in accordance with various aspects and implementations of the subject disclosure.

FIG. 1 is an example representation of a system/architecture in which a user equipment 102 communicates with radio equipment 104 of a base station (e.g., a gNodeB). As shown in FIG. 1, the base station radio equipment 104 includes a temperature sensor 106 that provides current temperature data 108 to a current data collection component 110 incorporated into or coupled to temperature and traffic load-to-power compensation logic 112. The current data collection component 110 also obtains current traffic load data 114; for example, the estimated downlink traffic load can be the traffic load averaged over a past certain period of time (e.g., one minute). The traffic load information can be retrieved by collecting radio statistic data and post processing, although such data retrieval can depend on an implementation strategy of a given radio design.

In field, the radio software (the temperature and traffic load-to-power compensation logic 112 in this example) reads the temperature from the designated temperature sensor and retrieves the estimated downlink traffic load. Using these two values, the temperature and traffic load-to-power compensation logic 112 is able to read and allocate a power compensation value from a compensation value data structure (e.g., a lookup table 116) stored in the radio data store (e.g., database). This table is generated when the radio is designed, by using controlled temperature values and controlled traffic load values while determining what power levels best perform with various pairs of the temperature values and the controlled traffic load values.

Note that traditionally, the radio downlink output power compensation lookup table was generated with a fixed traffic load (e.g., 100 percent); however the radio traffic load fluctuates in the field, causing radio hardware (e.g., power amplifiers) to experience self-heating that varies according to the radio traffic load, which affects the radio's internal temperature sensor reading. As a result, the designated temperature sensor readings do not necessarily provide a good correlation with the radio ambient temperature, as the downlink traffic load is usually not 100 percent, but rather regularly varies in the field. For example, at a given ambient temperature (e.g., 25 degrees ° C.), different downlink traffic can lead to different readings for the same temperature senor, which results in an incorrect compensation value being used by the radio software. The power accuracy is thus compromised because of the fluctuation of traffic in the field, whereby the actual serving cell coverage will deviate from what network operators originally planned, which contributes to KPI degradation for network operators.

Creation of the power compensation lookup table as described herein thus use a set of traffic loads (e.g., test vectors containing different payloads for downlink transmission) at each ambient set temperature of radio unit, instead of using only a static traffic load. The creation process records an optimal compensation value (e.g., obtained from measured power/performance data) for each pairing of traffic load vectors and temperature sensor readings. After stepping through the radio operating temperature range and the traffic load vectors, a lookup table (e.g., temperature sensor reading versus traffic load percentage versus compensation value) is created. Each compensation value corresponds to a temperature sensor reading and a traffic load pairing. In one implementation, the temperature sensor readings represent temperature intervals (e.g., generally 10 degrees ° C.) ranging from 0° C. to plus 95 degrees ° C.) that are used as indexes in one dimension (e.g., rows), while the traffic loads are percentage intervals (e.g., of ten percent to cover zero to one hundred percent) that are used as indexes in another dimension (e.g., columns).

FIG. 2 shows an example instance of one such lookup table 216. As can be seen, the power compensation values which were learned during table creation are indexed by temperature intervals and traffic load intervals. Note that a traditional table array 217 is shown in FIG. 2, but only for purposes of contrasting with the table 216, as the table 216 along with the logic described herein can replace the traditional solution.

The table 216 can be used in various alternative ways depending on a desired level of accuracy for the power compensation value to apply. For example, an approximate value can be obtained by rounding the actual current temperature to the nearest temperature interval, rounding the actual current traffic load to the nearest traffic load interval, and selecting the value from the correspondingly-indexed element.

However, a more accurate value can be obtained via interpolation (block 118, FIG. 1) of FIG. 1. For example, consider that the current traffic load is twenty-three percent (23%) based on the average traffic load over the last minute, and that the real time temperature is seventy-nine degrees centigrade (79° C.) as obtained from the sensor. In FIG. 2, the dashed lines 224 and 226 represent (approximately) these values. As can be seen, the four power compensation values that are closest to the lines' intersection provide four bounding power compensation values which bound the current temperature (79° C.) and traffic load values (23%). That is, the bounding indexes of (20%, 75° C.), (20%, 85° C.), (30%, 75° C.) and (30%, 85° C.) (represented in FIG. 2 via dashed block 228), provide the values for the logic to interpolate from their saved elements' data, namely −0.5 dB, −0.2 dB, −0.2 dB and 0 dB, respectively. Thus, approximation via interpolation is one way to find the compensation value by searching to find the closest bounding pairs of temperature readings and the closest bounding pairs of traffic load readings.

It should be noted that while less accurate, rounding can be used in conjunction with two-value interpolation. For example, if 43% is the load and 58° C. is the temperature, 43% can be rounded to 40% to find a single pair of values (40%, 55° C.) and (40%, 65° C.), with −1.7 and −0.8 being read as the two compensation values to interpolate. A similar alternative with these input data is to round 58° C. to 55° C. and find a single pair of values (40%, 55° C.) and (50%, 55° C.), with −1.7 and −1.5 being read as the two compensation values to interpolate. This is similar to what would occur if either the current temperature or the current traffic load was the same as one of the interval values, as basically only two values would be used in the interpolation results; (indeed, if both the current temperature and the current traffic load matched their respective interval values, the single value at these indices can simply be looked up).

In any event, the thermal effect caused by radio downlink dynamic traffic is included in in conjunction with the temperature sensor's read temperature data to modify the downlink output power more accurately according to real time radio ambient temperature and the actual traffic load. More accurate serving cell coverage is thus achieved in varying traffic conditions, relative to the prior solutions that do not consider the effects of traffic fluctuation and thus result in inaccurate downlink output power compensation, such that the actual serving cell coverage deviates from what was originally planned by network.

Figure 3:
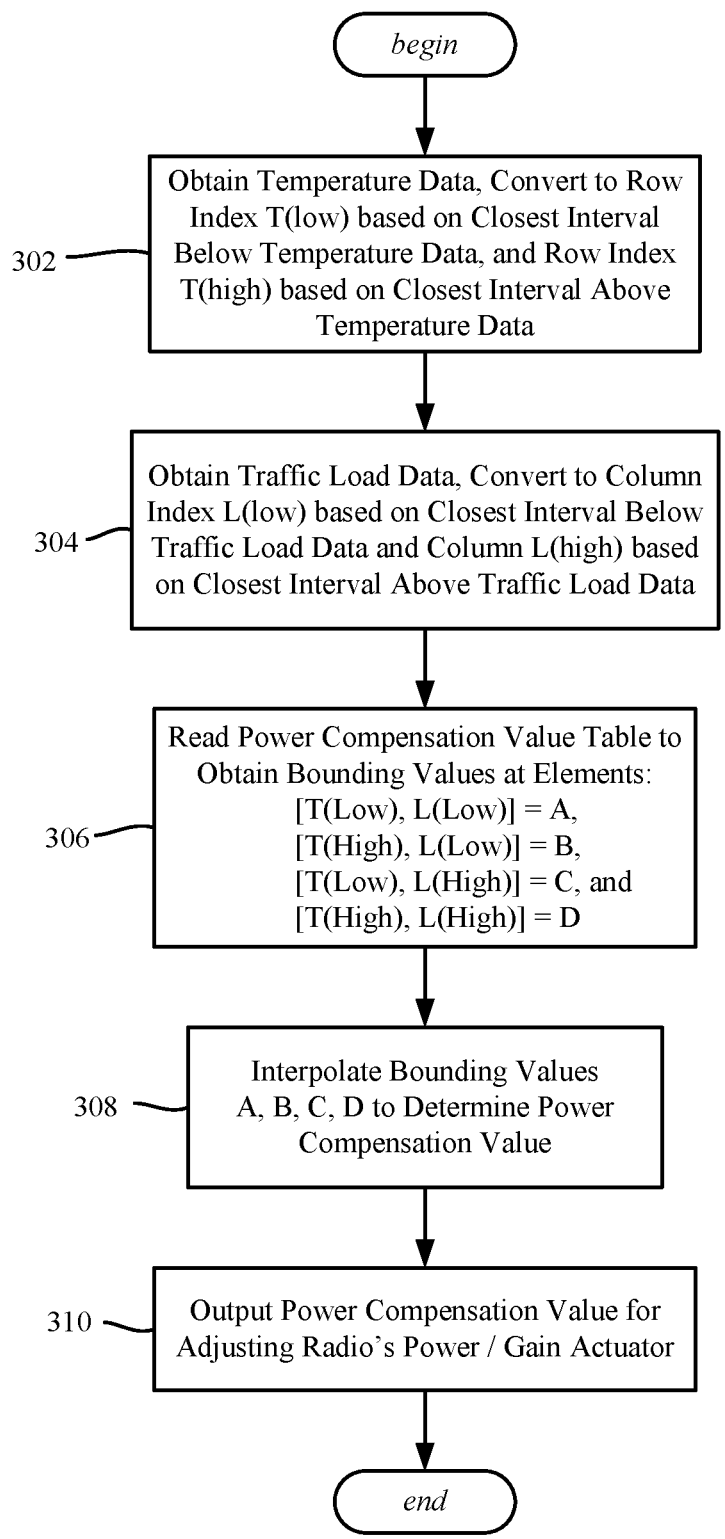
FIG. 3 is a flow diagram representing example operations of an implementation for determining a power compensation value, in accordance with various aspects and implementations of the subject disclosure.

FIG. 3 is a flow diagram showing example operations in one example implementation (full four-vale interpolation) summarizing the use of the power compensation value table by the radio when operating in the field. Operation 302 represents obtaining the current temperature data, and converting the current temperature data to two indices, namely a first row index T (low) based on closest interval below the current temperature data, and a second row index T (high) based on the closest interval above the current temperature data. Operation 304 represents obtaining the current traffic load data, and converting the traffic load temperature data to two indices, namely a first column index C (low) based on closest interval below the current temperature data, and a second column index C (high) based on the closest interval above the current temperature data.

Operation 306 uses the four combinations of the row and column index pairings [T (Low), L (Low)], [T (High), L (Low)], [T (Low), L (High)] and [T (High), L (High)] to obtain the four bounding values, shown in FIG. 3 as compensation values A, B, C and D respectively. These bounding compensation values are interpolated at operation 308 to obtain the final power compensation value used (for this timeframe) to adjust the radio's power/gain actuator at operation 310. For example, if when not compensated the actuator has a 46 dBm output power level, and the interpolated power compensation value is −1.5 dB, then the actuator is adjusted by the −1.5 dB offset to output 44.5 dBm.

If should be noted that while modifying the non-compensated output power with an offset is what radios currently do, (although presently without considering traffic load as described herein), it is also feasible to control the output power of a suitable type of amplifier directly. For example, the table can contain actual output power values instead of compensation values, such as ranging from about 40.8 dBm to about 47.3 dBm (using the table values of FIG. 2 summed with 46 dBm for the non-compensated amplifier). These post-compensated values can be represented digitally if desired. Saving the already compensated values may be more efficient with a digital-to-analog conversion type amplifier, for example.

Figure 4:
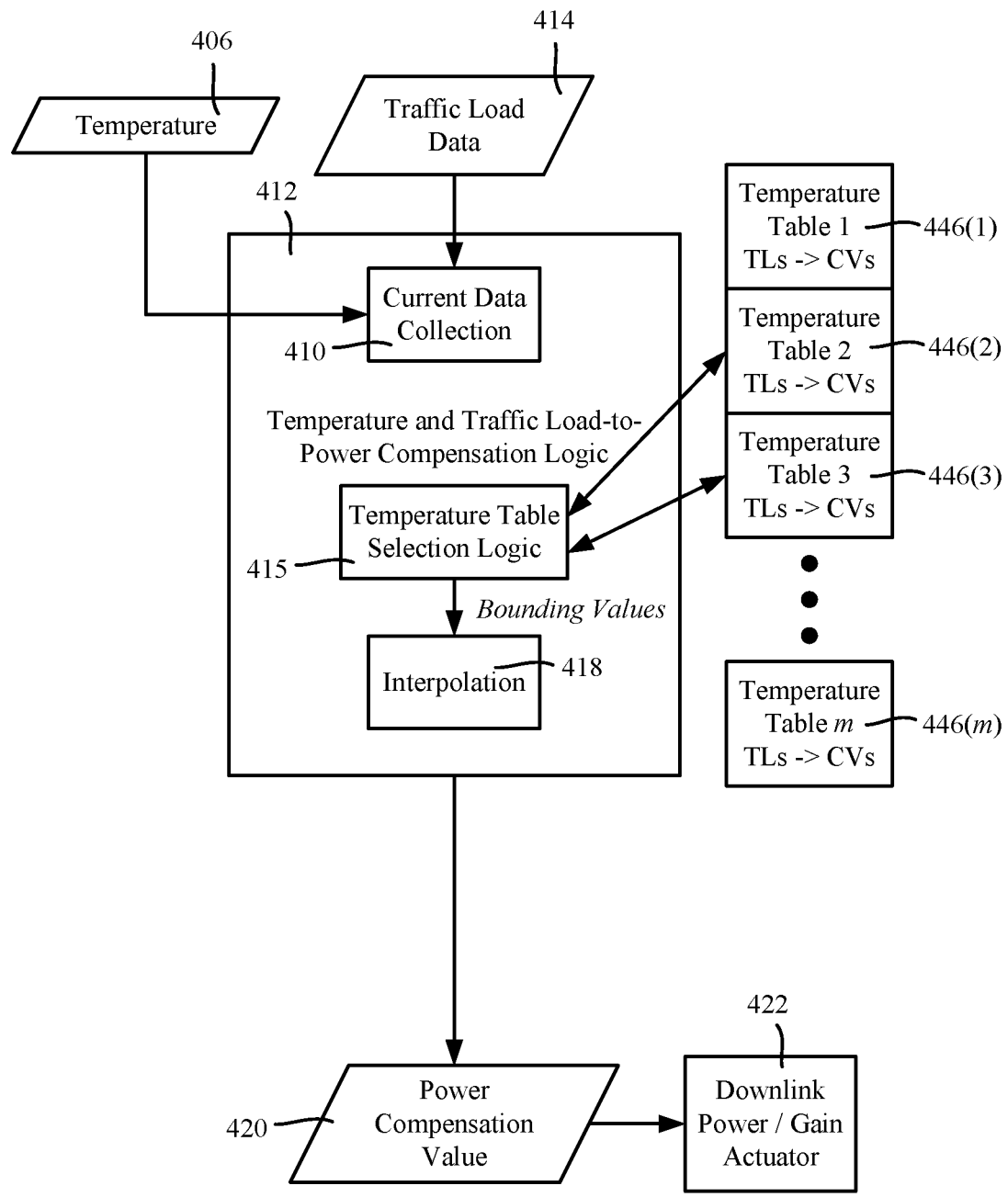
FIG. 4 depicts an example block diagram representation of an example system/architecture including radio equipment configured to determine a power compensation value based on accessing temperature tables based on current temperature data and traffic load data, in accordance with various aspects and implementations of the subject disclosure.

FIG. 4 shows an example alternative implementation in which multiple temperature tables (of traffic load interval indices-to-power compensation values) are saved to the radio; (in FIG. 4, similar components to those of FIG. 1 are labeled as 4xx instead of 1xx). In this example implementation, the temperature data 406 is used to select from among the temperature tables 446(1)-446(m) based on the current temperature, e.g., +21° C. can be easily converted to a first pointer to table 446(2) and a second pointer to table 446(3). Then, from the respective table 446(2) and 446(3), each of which contains traffic load indices-to-compensation values (TLs→CVs), respective pairs of compensation values (based on the bounding indices of the current traffic load) can be obtained and used to determine the final compensation value.

Figure 5:
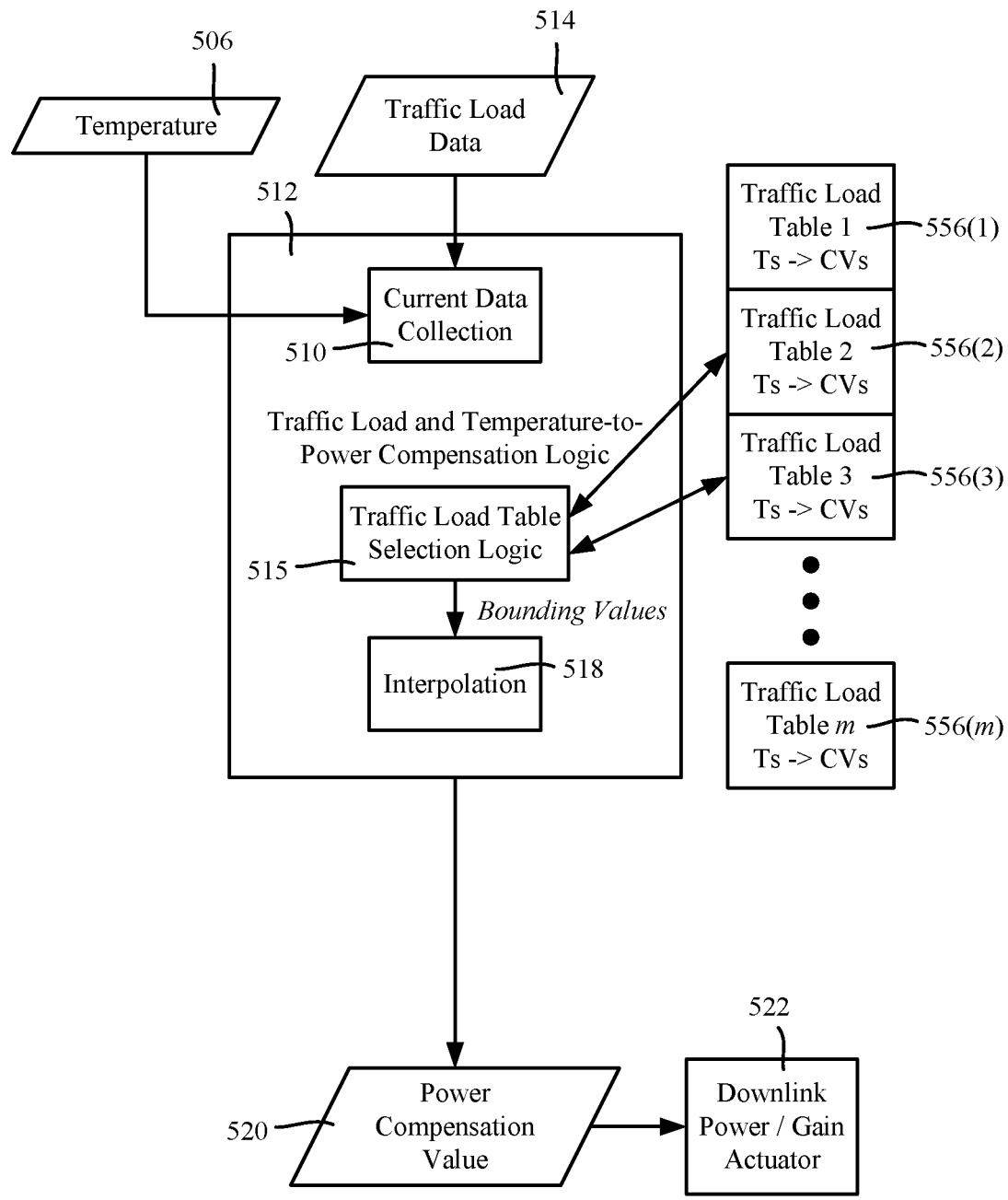
FIG. 5 depicts an example block diagram representation of an example system/architecture including radio equipment configured to determine a power compensation value based on accessing traffic load tables based on current traffic load data and temperature data, in accordance with various aspects and implementations of the subject disclosure.

FIG. 4 shows another example alternative implementation in which multiple traffic load tables (of temperature interval indices-to-power compensation values) are saved to the radio; (in FIG. 5, similar components to those of FIG. 1 are labeled as 5xx instead of 1xx). In this example implementation, the temperature data 506 is used to select from among the traffic load tables 446(1)-446(m) based on the current traffic load, e.g., 24% can be easily converted to a first pointer to table 556(2) and a second pointer to table 556(3). Then, from the respective table 556(2) and 556(3), each of which contains temperature indices-to-compensation values (Ts→CVs), respective pairs of compensation values (based on the bounding indices of the current traffic load) can be obtained and used to determine the final compensation value.

It should be noted that the compensation values may be able to be fit to a function that inputs the current temperature data and traffic load data and outputs the power compensation value. Artificial intelligence/machine learning (AI/ML) can be used to learn such a function. Similarly, it is feasible to train an AI/ML model for a radio based on the various possible input such that in inference, the trained model can be used to output the power compensation value. Indeed, in training the incremental intervals can be much smaller, such as one degree instead of ten degrees, and one percent instead of ten percent, whereby the collected current data need not be rounded or the like to simply obtain the matching power compensation value.

Figure 6:
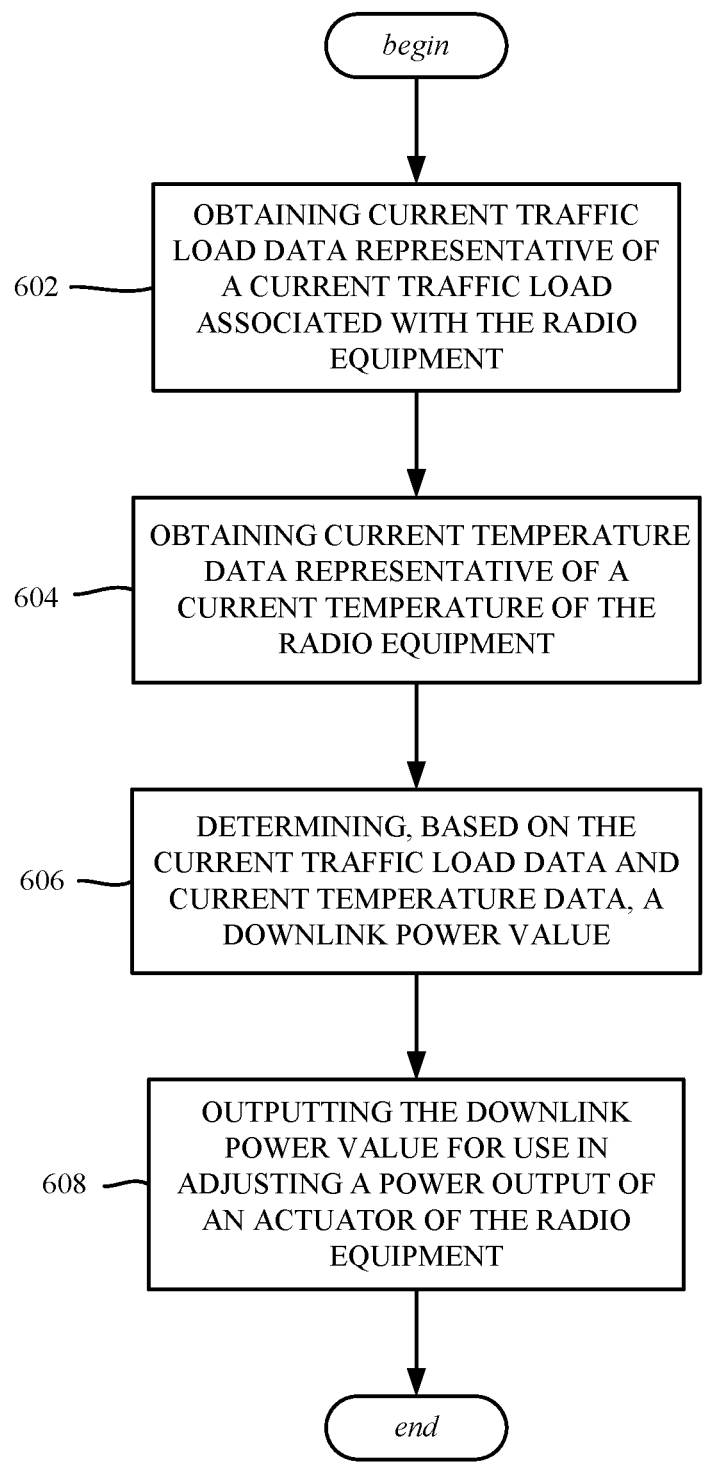
FIG. 6 is a flow diagram showing example operations related to determining, based on the current traffic load data and current temperature data associated with a radio equipment, a downlink power value for use in adjusting the radio equipment's power output, in accordance with various aspects and implementations of the subject disclosure.

One or more aspects can be embodied in radio equipment, such as represented in the example operations of FIG. 6, and for example can include a memory that stores computer executable components and/or operations, and a processor that executes computer executable components and/or operations stored in the memory. Example operations can include operation 602, which represents obtaining current traffic load data representative of a current traffic load associated with the radio equipment. Example operation 604 represents obtaining current temperature data representative of a current temperature of the radio equipment. Example operation 606 represents determining, based on the current traffic load data and current temperature data, a downlink power value. Example operation 608 represents outputting the downlink power value for use in adjusting a power output of an actuator of the radio equipment.

The current traffic load data can include a percentage value based on traffic load data representative of previous traffic loads averaged over a defined prior timeframe. The downlink power value can include a downlink power compensation value, and determining the downlink power compensation value can include obtaining the downlink power compensation value by accessing, based on a pairing of the current traffic load data and the current temperature data, a downlink power compensation lookup data structure stored via the radio equipment, the downlink power compensation lookup data structure including compensation value elements indexed by a first group of identified temperature settings in a first dimension and indexed by a second group of identified traffic load settings in a second dimension.

The identified temperature settings in the first dimension can correspond to temperature intervals, in which the identified traffic load settings in the second dimension can correspond to traffic load intervals. Obtaining the downlink power compensation value can include selecting a first bounding compensation value from the compensation lookup data structure based on a first compensation value element associated with a lower temperature interval closest to and below the temperature data and a lower traffic load interval closest to and below the traffic load data, selecting a second bounding compensation value from the compensation lookup data structure based on a second compensation value element associated with a higher temperature interval closest to and above the temperature data and a lower traffic load interval closest to and below the traffic load data, selecting a third bounding compensation value from the compensation lookup data structure based on a third compensation value element associated with a lower temperature interval closest to and below the temperature data and an upper traffic load interval closest to and above the traffic load data, and selecting a fourth bounding compensation value from the compensation lookup data structure based on a fourth compensation value element associated with an upper temperature interval closest to and above the temperature data and an upper traffic load interval closest to and above the traffic load data. Obtaining the downlink power compensation value can include interpolating between the first bounding compensation value, the second bounding compensation value, the third bounding compensation value, and the fourth bounding compensation value to obtain the downlink power compensation value.

Determining the downlink power value can include selecting at least one temperature table based on the current temperature data, and reading data from the at least one temperature table based on the current traffic load data to obtain power value data for determining the downlink power value.

Determining the downlink power value can include selecting a lower bounding temperature table based on the current temperature data, selecting an upper bounding temperature table based on the current temperature data, reading first power value data from the lower bounding temperature table based on the current traffic load data, reading second power value data from the upper bounding temperature table based on the current traffic load data, and interpolating the first power value data and the second power value data to obtain the downlink power value. The first power value data can include a first bounding power value corresponding to a first lower bounding traffic load interval in the lower bounding temperature table, and a second bounding power value corresponding to a first upper bounding traffic load interval in the lower bounding temperature table; the second power value data can include a third bounding power value corresponding to a third lower bounding traffic load interval in the upper bounding temperature table, and a fourth bounding power value corresponding to a fourth lower bounding traffic load interval in the upper bounding temperature table.

Determining the downlink power value can include selecting at least one traffic load table based on the current traffic load data, and reading data from the at least one traffic load table based on the current temperature data to obtain power value data for determining the downlink power value.

Determining the downlink power value can include selecting a lower bounding traffic load table based on the current traffic load data, selecting an upper bounding traffic load table based on the current traffic load data, reading first power value data from the lower bounding traffic load table based on the current temperature data, reading second power value data from the upper bounding traffic load table based on the current temperature data, and interpolating the first power value data and the second power value data to obtain the downlink power value. The first power value data can include a first bounding power value corresponding to a first lower bounding temperature interval in the lower bounding traffic load table, and a second bounding power value corresponding to a first upper bounding temperature interval in the lower bounding traffic load table, and wherein the second power value data can include a third bounding power value corresponding to a third lower bounding temperature interval in the upper bounding traffic load table, and a fourth bounding power value corresponding to a fourth lower bounding temperature interval in the upper bounding traffic load table.

Figure 7:
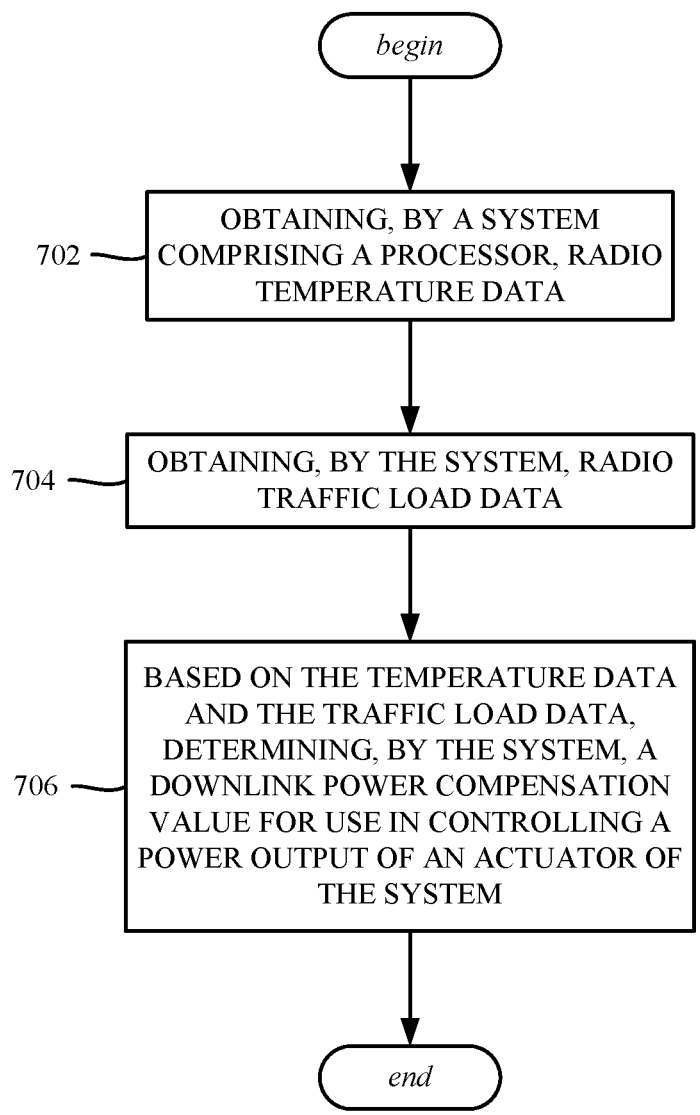
FIG. 7 is a flow diagram showing example operations related to determining, based on temperature data and traffic load data, a downlink power compensation value for use in controlling power output, in accordance with various aspects and implementations of the subject disclosure.

One or more example aspects, such as corresponding to example operations of a method, are represented in FIG. 7. Example operation 702 represents obtaining, by a system comprising a processor, radio temperature data. Example operation 704 represents obtaining, by the system, radio traffic load data. Example operation 706 represents based on the temperature data and the traffic load data, determining, by the system, a downlink power compensation value for use in controlling a power output of an actuator of the system.

Determining the downlink power compensation value can include accessing a compensation value table based on the temperature data and the traffic load data to obtain a first bounding compensation value from the compensation value table based on a lower temperature interval closest to and below the temperature data and a lower traffic load interval closest to and below the traffic load data, a second bounding compensation value from the compensation value table based on an upper temperature interval closest to and above the temperature data and a lower traffic load interval closest to and below the traffic load data, a third bounding compensation value from the compensation value table based on a lower temperature interval closest to and below the temperature data and an upper temperature traffic load interval closest to and above the traffic load data, a fourth bounding compensation value from the compensation value table based on an upper temperature interval closest to and above the temperature data and an upper temperature traffic load interval closest to and above the traffic load data; and determining the downlink power compensation value further can include interpolating between the first bounding compensation value, the second bounding compensation value, the third bounding compensation value, and the fourth bounding compensation value to obtain the downlink power compensation value.

Determining the determining of the downlink power compensation value can include selecting a lower bounding temperature table based on the current temperature data, selecting an upper bounding temperature table based on the current temperature data, reading first power compensation value data from the lower bounding temperature table based on the current traffic load data, reading second power compensation value data from the upper bounding temperature table based on the current traffic load data, and interpolating the first power compensation value data and the second power compensation value data to obtain the downlink power compensation value.

Reading the first power compensation value data from the lower bounding temperature table based on the current traffic load data can include reading a first bounding power compensation value corresponding to a first lower bounding traffic load interval in the lower bounding temperature table, and reading a second bounding power compensation value corresponding to a first upper bounding traffic load interval in the lower bounding temperature table, and wherein the reading of the second power compensation value data from the upper bounding temperature table based on the current traffic load data can include reading a third bounding power compensation value corresponding to a third lower bounding traffic load interval in the upper bounding temperature table, and reading a fourth bounding power compensation value corresponding to a fourth upper bounding traffic load interval in the upper bounding temperature table.

Determining of the downlink power compensation value can include selecting a lower bounding traffic load table based on the current traffic load data, selecting an upper bounding traffic load table based on the current traffic load data, reading first power compensation value data from the lower bounding traffic load table based on the current temperature data, reading second power compensation value data from the upper bounding traffic load table based on the current temperature data, and interpolating the first power compensation value data and the second power compensation value data to obtain the downlink power compensation value.

Reading of the first power compensation value data from the lower bounding traffic load table based on the current temperature data can include reading a first bounding power compensation value corresponding to a first lower bounding temperature interval in the lower bounding traffic load table, and reading a second bounding power compensation value corresponding to a first upper bounding temperature interval in the lower bounding traffic load table, and wherein the reading of the second power compensation value data from the upper bounding traffic load table based on the current temperature data can include reading a third bounding power compensation value corresponding to a third lower bounding temperature interval in the upper bounding traffic load table, and reading a fourth bounding power compensation value corresponding to a fourth upper bounding temperature interval in the upper bounding traffic load table.

Figure 8:
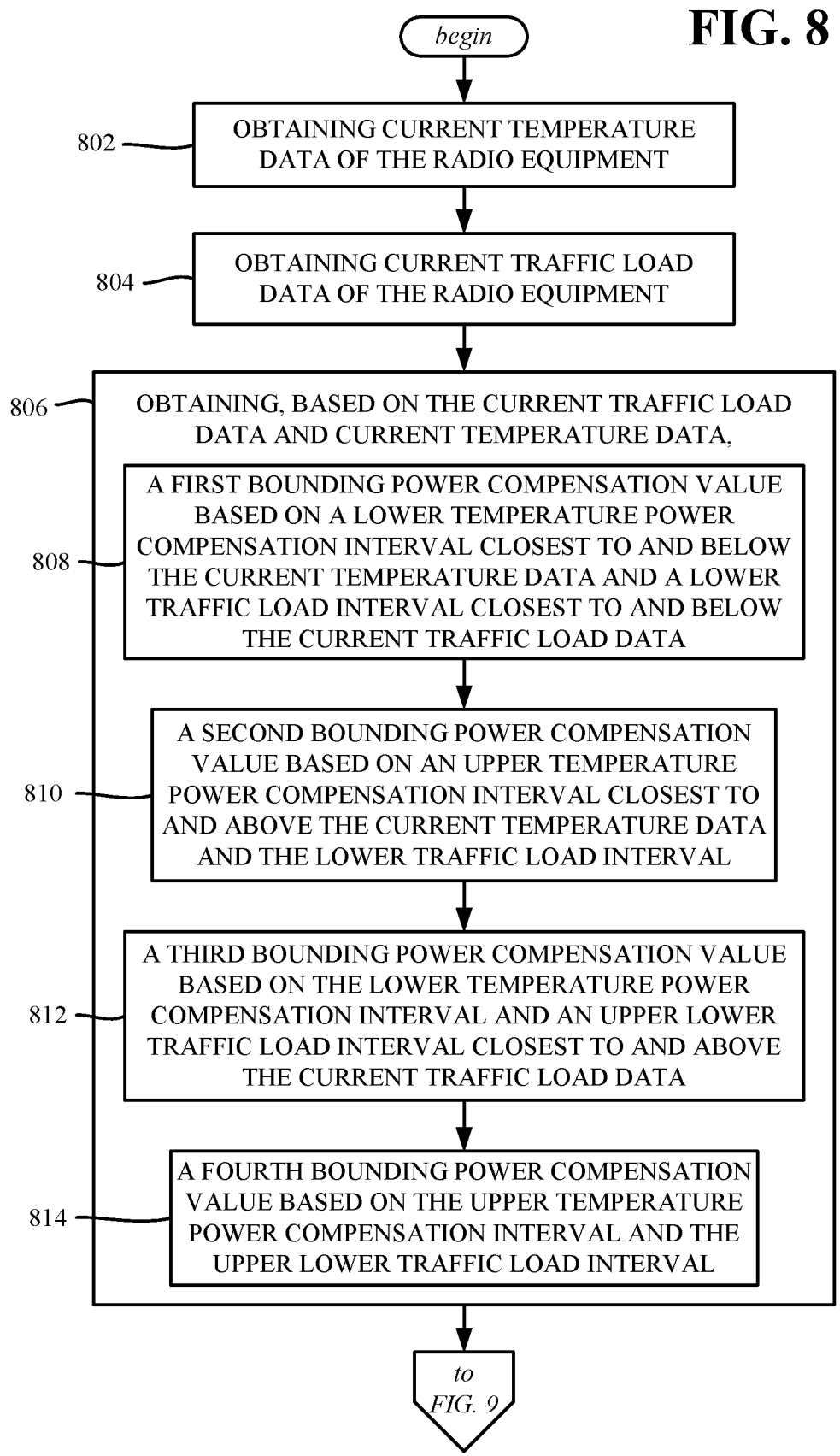
FIGS. 8 and 9 comprise a flow diagram showing example operations related to determining downlink power compensation values for controlling power output of a radio, in which the compensation values are obtained based on temperature data and traffic load data, in accordance with various aspects and implementations of the subject disclosure.
Figure 9:
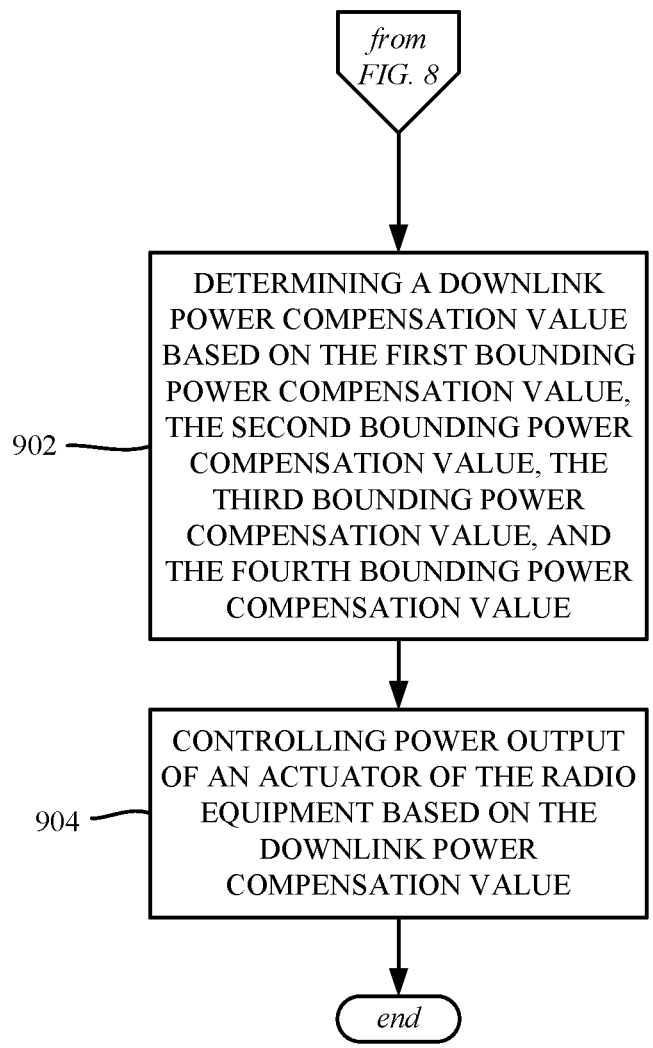

FIGS. 8 and 9 summarize various example operations, e.g., corresponding to a machine-readable medium, comprising executable instructions that, when executed by a processor of radio equipment, facilitate performance of operations. Example operation 802 of FIG. 8 represents obtaining current temperature data of the radio equipment. Example operation 804 represents obtaining current traffic load data of the radio equipment. Example operation 806 represents obtaining, based on the current traffic load data and current temperature data, a first bounding power compensation value based on a lower temperature power compensation interval closest to and below the current temperature data and a lower traffic load interval closest to and below the current traffic load data (block 808), a second bounding power compensation value based on an upper temperature power compensation interval closest to and above the current temperature data and the lower traffic load interval (block 810), a third bounding power compensation value based on the lower temperature power compensation interval and an upper lower traffic load interval closest to and above the current traffic load data (block 812), and a fourth bounding power compensation value based on the upper temperature power compensation interval and the upper lower traffic load interval (block 814). The operations continue at FIG. 9, in which example operation 902 of FIG. 9 represents determining a downlink power compensation value based on the first bounding power compensation value, the second bounding power compensation value, the third bounding power compensation value, and the fourth bounding power compensation value. Example operation 904 represents controlling power output of an actuator of the radio equipment based on the downlink power compensation value.

Obtaining the first bounding power compensation value, the second bounding power compensation value, the third bounding power compensation value, and the fourth bounding power compensation value can include accessing, based on a pairing of the current traffic load data and the current temperature data, a downlink power compensation table stored on the radio equipment, the downlink power compensation table comprising power compensation value elements indexed by a first group of identified temperature interval settings in a first dimension and indexed by a second group of identified traffic load interval settings in a second dimension.

Obtaining the first bounding power compensation value, the second bounding power compensation value, the third bounding power compensation value, and the fourth bounding power compensation value can include accessing, based on the current temperature data, a first temperature table corresponding to the lower temperature power compensation interval to obtain the first bounding power compensation value based on a first lower traffic load interval in the first temperature table that is closest to and below the current traffic load data, and to obtain the second bounding power compensation value based on a first upper traffic load interval in the first temperature table that is closest to and above the current traffic load data, and accessing, based on the current temperature data, a second temperature table corresponding to the upper temperature power compensation interval to obtain the third bounding power compensation value based on a second lower traffic load interval in the second temperature table that is closest to and below the current traffic load data, and to obtain the fourth bounding power compensation value based on a second upper traffic load interval in the second temperature table that is closest to and above the current traffic load data.

Obtaining the first bounding power compensation value, the second bounding power compensation value, the third bounding power compensation value, and the fourth bounding power compensation value can include accessing, based on the current traffic load data, a first traffic load table corresponding to the lower traffic load power compensation interval to obtain the first bounding power compensation value based on a first lower temperature interval in the first traffic load table that is closest to and below the current temperature data, and to obtain the second bounding power compensation value based on a first upper temperature interval in the first traffic load table that is closest to and above the current temperature data, and accessing, based on the current traffic load data, a second traffic load table corresponding to the upper traffic load power compensation interval to obtain the third bounding power compensation value based on a second lower temperature interval in the second traffic load table that is closest to and below the current temperature data, and to obtain the fourth bounding power compensation value based on a second upper temperature interval in the second traffic load table that is closest to and above the current temperature data.

As can be seen, the technology described herein facilitates the use of more accurate output compensation values for radio amplifiers/actuators based on real time radio ambient temperature as well as varying traffic loads. By considering the downlink traffic load in the downlink output power compensation table, a good correlation is maintained between the radio internal temperature reading and the actual radio ambient temperature, resulting in a more accurate power compensation value for any combination of downlink traffic load and internal temperature reading. Because the output power compensation adapts to varying radio temperatures and dynamic traffic loads, a serving cell's coverage of its served radio equipment is consequently improved.

Figure 10:
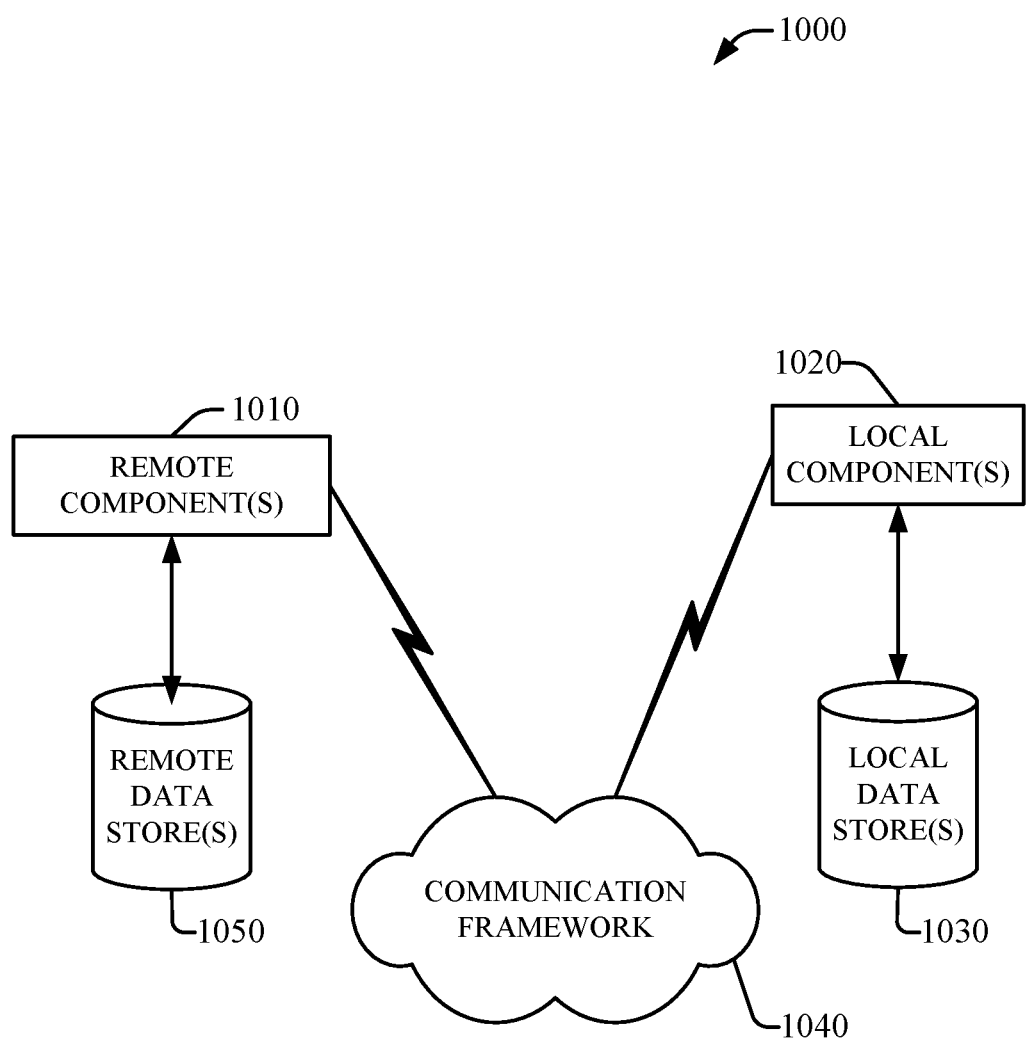
FIG. 10 is a block diagram representing an example computing environment into which aspects of the subject matter described herein may be incorporated.

FIG. 10 is a schematic block diagram of a computing environment 1000 with which the disclosed subject matter can interact. The system 1000 comprises one or more remote component(s) 1010. The remote component(s) 1010 can be hardware and/or software (e.g., threads, processes, computing devices). In some embodiments, remote component(s) 1010 can be a distributed computer system, connected to a local automatic scaling component and/or programs that use the resources of a distributed computer system, via communication framework 1040. Communication framework 1040 can comprise wired network devices, wireless network devices, mobile devices, wearable devices, radio access network devices, gateway devices, femtocell devices, servers, etc.

The system 1000 also comprises one or more local component(s) 1020. The local component(s) 1020 can be hardware and/or software (e.g., threads, processes, computing devices). In some embodiments, local component(s) 1020 can comprise an automatic scaling component and/or programs that communicate/use the remote resources 1010, etc., connected to a remotely located distributed computing system via communication framework 1040.

One possible communication between a remote component(s) 1010 and a local component(s) 1020 can be in the form of a data packet adapted to be transmitted between two or more computer processes. Another possible communication between a remote component(s) 1010 and a local component(s) 1020 can be in the form of circuit-switched data adapted to be transmitted between two or more computer processes in radio time slots. The system 1000 comprises a communication framework 1040 that can be employed to facilitate communications between the remote component(s) 1010 and the local component(s) 1020, and can comprise an air interface, e.g., Uu interface of a UMTS network, via a long-term evolution (LTE) network, etc. Remote component(s) 1010 can be operably connected to one or more remote data store(s) 1050, such as a hard drive, solid state drive, SIM card, device memory, etc., that can be employed to store information on the remote component(s) 1010 side of communication framework 1040. Similarly, local component(s) 1020 can be operably connected to one or more local data store(s) 1030, that can be employed to store information on the local component(s) 1020 side of communication framework 1040.

Figure 11:
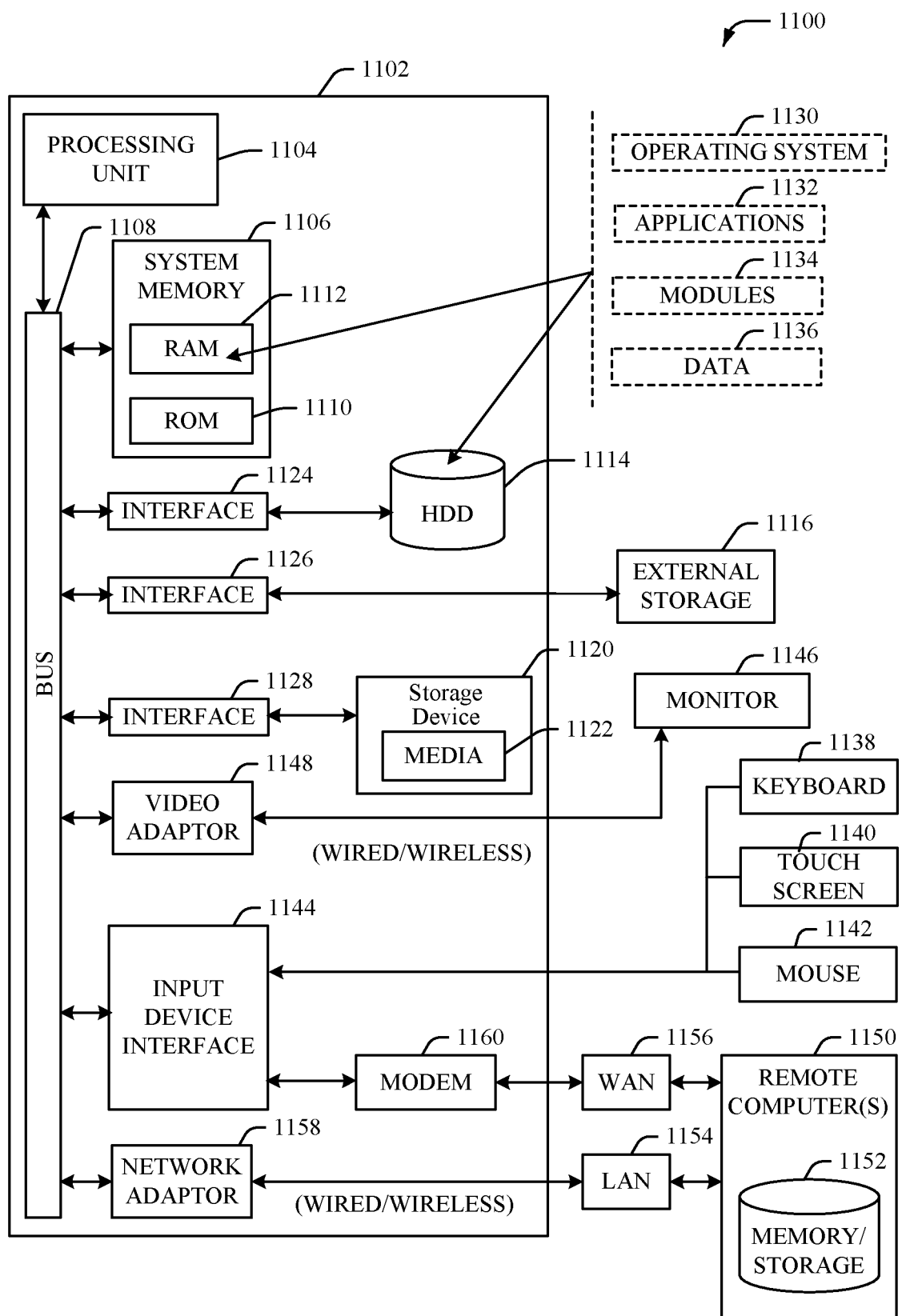
FIG. 11 depicts an example schematic block diagram of a computing environment with which the disclosed subject matter can interact/be implemented at least in part, in accordance with various aspects and implementations of the subject disclosure.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), and can include one or more external storage devices 1116 (e.g., a magnetic floppy disk drive (FDD) 1116, a memory stick or flash drive reader, a memory card reader, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114.

Other internal or external storage can include at least one other storage device 1120 with storage media 1122 (e.g., a solid state storage device, a nonvolatile memory device, and/or an optical disk drive that can read or write from removable media such as a CD-ROM disc, a DVD, a BD, etc.). The external storage 1116 can be facilitated by a network virtual machine. The HDD 1114, external storage device(s) 1116 and storage device (e.g., drive) 1120 can be connected to the system bus 1108 by an HDD interface 1124, an external storage interface 1126 and a drive interface 1128, respectively.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1194 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. Radio equipment, comprising:
   a processor; and
   a memory that stores executable instructions that, when executed by the processor, facilitate performance of operations, the operations comprising:
   obtaining current traffic load data representative of a current traffic load associated with the radio equipment;
   obtaining current temperature data representative of a current temperature of the radio equipment;
   determining, based on the current traffic load data and current temperature data, a downlink power value; and
   outputting the downlink power value for use in adjusting a power output of an actuator of the radio equipment.

2. The radio equipment of claim 1, wherein the current traffic load data comprises a percentage value based on traffic load data representative of previous traffic loads averaged over a defined prior timeframe.

3. The radio equipment of claim 1, wherein the downlink power value comprises a downlink power compensation value, and wherein the determining of the downlink power compensation value comprises obtaining the downlink power compensation value by accessing, based on a pairing of the current traffic load data and the current temperature data, a downlink power compensation lookup data structure stored via the radio equipment, the downlink power compensation lookup data structure comprising compensation value elements indexed by a first group of identified temperature settings in a first dimension and indexed by a second group of identified traffic load settings in a second dimension.

4. The radio equipment of claim 3, wherein the identified temperature settings in the first dimension correspond to temperature intervals, wherein the identified traffic load settings in the second dimension correspond to traffic load intervals, and wherein the obtaining of the downlink power compensation value comprises:
   selecting a first bounding compensation value from the compensation lookup data structure based on a first compensation value element associated with a lower temperature interval closest to and below the temperature data and a lower traffic load interval closest to and below the traffic load data,
   selecting a second bounding compensation value from the compensation lookup data structure based on a second compensation value element associated with a higher temperature interval closest to and above the temperature data and a lower traffic load interval closest to and below the traffic load data,
   selecting a third bounding compensation value from the compensation lookup data structure based on a third compensation value element associated with a lower temperature interval closest to and below the temperature data and an upper traffic load interval closest to and above the traffic load data,
   selecting a fourth bounding compensation value from the compensation lookup data structure based on a fourth compensation value element associated with an upper temperature interval closest to and above the temperature data and an upper traffic load interval closest to and above the traffic load data, and
   interpolating between the first bounding compensation value, the second bounding compensation value, the third bounding compensation value, and the fourth bounding compensation value to obtain the downlink power compensation value.

5. The radio equipment of claim 1, wherein the determining of the downlink power value comprises selecting at least one temperature table based on the current temperature data, and reading data from the at least one temperature table based on the current traffic load data to obtain power value data for determining the downlink power value.

6. The radio equipment of claim 1, wherein the determining of the downlink power value comprises selecting a lower bounding temperature table based on the current temperature data, selecting an upper bounding temperature table based on the current temperature data, reading first power value data from the lower bounding temperature table based on the current traffic load data, reading second power value data from the upper bounding temperature table based on the current traffic load data, and interpolating the first power value data and the second power value data to obtain the downlink power value.

7. The radio equipment of claim 6, wherein the first power value data comprises a first bounding power value corresponding to a first lower bounding traffic load interval in the lower bounding temperature table, and a second bounding power value corresponding to a first upper bounding traffic load interval in the lower bounding temperature table, and wherein the second power value data comprises a third bounding power value corresponding to a third lower bounding traffic load interval in the upper bounding temperature table, and a fourth bounding power value corresponding to a fourth lower bounding traffic load interval in the upper bounding temperature table.

8. The radio equipment of claim 1, wherein the determining of the downlink power value comprises selecting at least one traffic load table based on the current traffic load data, and reading data from the at least one traffic load table based on the current temperature data to obtain power value data for determining the downlink power value.

9. The radio equipment of claim 1, wherein the determining of the downlink power value comprises selecting a lower bounding traffic load table based on the current traffic load data, selecting an upper bounding traffic load table based on the current traffic load data, reading first power value data from the lower bounding traffic load table based on the current temperature data, reading second power value data from the upper bounding traffic load table based on the current temperature data, and interpolating the first power value data and the second power value data to obtain the downlink power value.

10. The radio equipment of claim 9, wherein the first power value data comprises a first bounding power value corresponding to a first lower bounding temperature interval in the lower bounding traffic load table, and a second bounding power value corresponding to a first upper bounding temperature interval in the lower bounding traffic load table, and wherein the second power value data comprises a third bounding power value corresponding to a third lower bounding temperature interval in the upper bounding traffic load table, and a fourth bounding power value corresponding to a fourth lower bounding temperature interval in the upper bounding traffic load table.

11. A method, comprising:
    obtaining, by a system comprising a processor, radio temperature data,
    obtaining, by the system, radio traffic load data, and based on the temperature data and the traffic load data, determining, by the system, a downlink power compensation value for use in controlling a power output of an actuator of the system.

12. The method of claim 11, wherein the determining of the downlink power compensation value comprises:
accessing a compensation value table based on the temperature data and the traffic load data to obtain:
a first bounding compensation value from the compensation value table based on a lower temperature interval closest to and below the temperature data and a lower traffic load interval closest to and below the traffic load data,
a second bounding compensation value from the compensation value table based on an upper temperature interval closest to and above the temperature data and a lower traffic load interval closest to and below the traffic load data,
a third bounding compensation value from the compensation value table based on a lower temperature interval closest to and below the temperature data and an upper temperature traffic load interval closest to and above the traffic load data,
a fourth bounding compensation value from the compensation value table based on an upper temperature interval closest to and above the temperature data and an upper temperature traffic load interval closest to and above the traffic load data; and
interpolating between the first bounding compensation value, the second bounding compensation value, the third bounding compensation value, and the fourth bounding compensation value to obtain the downlink power compensation value.

13. The method of claim 11, wherein the determining of the downlink power compensation value comprises selecting a lower bounding temperature table based on the current temperature data, selecting an upper bounding temperature table based on the current temperature data, reading first power compensation value data from the lower bounding temperature table based on the current traffic load data, reading second power compensation value data from the upper bounding temperature table based on the current traffic load data, and interpolating the first power compensation value data and the second power compensation value data to obtain the downlink power compensation value.

14. The method of claim 13, wherein the reading of the first power compensation value data from the lower bounding temperature table based on the current traffic load data comprises reading a first bounding power compensation value corresponding to a first lower bounding traffic load interval in the lower bounding temperature table, and reading a second bounding power compensation value corresponding to a first upper bounding traffic load interval in the lower bounding temperature table, and wherein the reading of the second power compensation value data from the upper bounding temperature table based on the current traffic load data comprises reading a third bounding power compensation value corresponding to a third lower bounding traffic load interval in the upper bounding temperature table, and reading a fourth bounding power compensation value corresponding to a fourth upper bounding traffic load interval in the upper bounding temperature table.

15. The method of claim 11, wherein the determining of the downlink power compensation value comprises selecting a lower bounding traffic load table based on the current traffic load data, selecting an upper bounding traffic load table based on the current traffic load data, reading first power compensation value data from the lower bounding traffic load table based on the current temperature data, reading second power compensation value data from the upper bounding traffic load table based on the current temperature data, and interpolating the first power compensation value data and the second power compensation value data to obtain the downlink power compensation value.

16. The method of claim 15, wherein the reading of the first power compensation value data from the lower bounding traffic load table based on the current temperature data comprises reading a first bounding power compensation value corresponding to a first lower bounding temperature interval in the lower bounding traffic load table, and reading a second bounding power compensation value corresponding to a first upper bounding temperature interval in the lower bounding traffic load table, and wherein the reading of the second power compensation value data from the upper bounding traffic load table based on the current temperature data comprises reading a third bounding power compensation value corresponding to a third lower bounding temperature interval in the upper bounding traffic load table, and reading a fourth bounding power compensation value corresponding to a fourth upper bounding temperature interval in the upper bounding traffic load table.

17. A non-transitory machine-readable medium, comprising executable instructions that, when executed by a processor of radio equipment, facilitate performance of operations, the operations comprising:
obtaining current temperature data of the radio equipment;
obtaining current traffic load data of the radio equipment;
obtaining, based on the current traffic load data and current temperature data,
a first bounding power compensation value based on a lower temperature power compensation interval closest to and below the current temperature data and a lower traffic load interval closest to and below the current traffic load data,
a second bounding power compensation value based on an upper temperature power compensation interval closest to and above the current temperature data and the lower traffic load interval,
a third bounding power compensation value based on the lower temperature power compensation interval and an upper lower traffic load interval closest to and above the current traffic load data, and
a fourth bounding power compensation value based on the upper temperature power compensation interval and the upper lower traffic load interval;
determining a downlink power compensation value based on the first bounding power compensation value, the second bounding power compensation value, the third bounding power compensation value, and the fourth bounding power compensation value; and
controlling power output of an actuator of the radio equipment based on the downlink power compensation value.

18. The non-transitory machine-readable medium of claim 17, wherein the obtaining of the first bounding power compensation value, the second bounding power compensation value, the third bounding power compensation value, and the fourth bounding power compensation value comprises accessing, based on a pairing of the current traffic load data and the current temperature data, a downlink power compensation table stored on the radio equipment, the downlink power compensation table comprising power compensation value elements indexed by a first group of identified temperature interval settings in a first dimension and indexed by a second group of identified traffic load interval settings in a second dimension.

19. The non-transitory machine-readable medium of claim 17, wherein the obtaining of the first bounding power compensation value, the second bounding power compensation value, the third bounding power compensation value, and the fourth bounding power compensation value comprises:

accessing, based on the current temperature data, a first temperature table corresponding to the lower temperature power compensation interval to obtain the first bounding power compensation value based on a first lower traffic load interval in the first temperature table that is closest to and below the current traffic load data, and to obtain the second bounding power compensation value based on a first upper traffic load interval in the first temperature table that is closest to and above the current traffic load data, and accessing, based on the current temperature data, a second temperature table corresponding to the upper temperature power compensation interval to obtain the third bounding power compensation value based on a second lower traffic load interval in the second temperature table that is closest to and below the current traffic load data, and to obtain the fourth bounding power compensation value based on a second upper traffic load interval in the second temperature table that is closest to and above the current traffic load data.

20. The non-transitory machine-readable medium of claim 17, wherein the obtaining of the first bounding power compensation value, the second bounding power compensation value, the third bounding power compensation value, and the fourth bounding power compensation value comprises:

accessing, based on the current traffic load data, a first traffic load table corresponding to the lower traffic load power compensation interval to obtain the first bounding power compensation value based on a first lower temperature interval in the first traffic load table that is closest to and below the current temperature data, and to obtain the second bounding power compensation value based on a first upper temperature interval in the first traffic load table that is closest to and above the current temperature data, and accessing, based on the current traffic load data, a second traffic load table corresponding to the upper traffic load power compensation interval to obtain the third bounding power compensation value based on a second lower temperature interval in the second traffic load table that is closest to and below the current temperature data, and to obtain the fourth bounding power compensation value based on a second upper temperature interval in the second traffic load table that is closest to and above the current temperature data.

* * * * *